July 4, 1967  G. BRINGERT  3,329,906
DEVICE FOR DETECTING THE PRESENCE OF METALLIC
OBJECTS IN MAGNETIC ORE
Filed Oct. 21, 1965
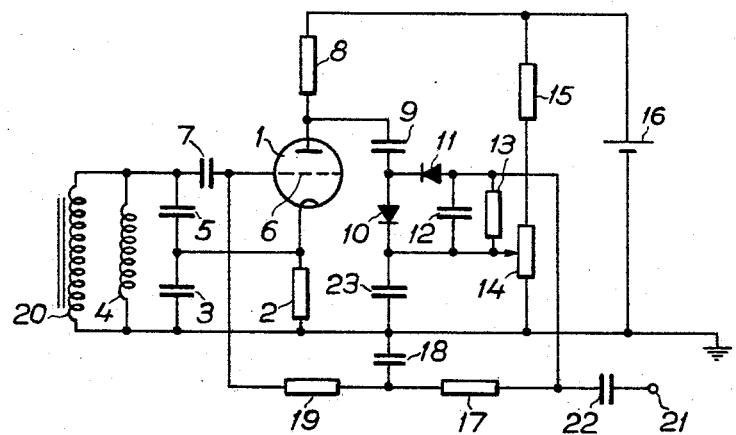
INVENTOR.
GÖRAN BRINGERT
BY
Bailey, Stephens & Huettig
ATTORNEYS

United States Patent Office 3,329,906
Patented July 4, 1967

3,329,906
DEVICE FOR DETECTING THE PRESENCE OF METALLIC OBJECTS IN MAGNETIC ORE
Göran Bringert, Vasteras, Sweden, assignor to Allmanna Svenska Elektriska Aktiebolaget, Vasteras, Sweden, a corporation of Sweden
Filed Oct. 21, 1965, Ser. No. 499,406
Claims priority, application Sweden, Nov. 10, 1964, 13,510/64
1 Claim. (Cl. 331—65)

In order to detect the presence of metallic particles in non-magnetic material it is known for the material being examined to pass through or past a coil which together with a capacitor constitutes the resonant circuit of an oscillator connection. If a metallic particle comes within the magnetic field of the resonant circuit the resonant amplitude of the circuit is altered and thereby also the amplitude of the output from the common oscillator and amplifier tube. A similar device is known for example through US Patent 2,919,413.

Particularly within the mining industry there is a great need for such a device to indicate the presence of non-magnetic alloyed steel, for example parts of drilling steel, in magnetic iron ore. The presence of magnetic ore in the resonant circuit causes an inductance increase in the resonant circuit and this results in an increase of the amplitude of the output from the amplifier. A sudden reduction or a complete stoppage of the ore on the transport conveyor going through or past the coil consequently causes a reduction in the amplitude in the output.

If a non-magnetic metallic object is present in the magnetic field, an increase of the resistance of the circuit will occur due to the eddy current losses which occur in the object. This resistance increase causes a reduction of the amplitude of the output. A great reduction or complete stoppage of ore thus gives the same indication as a non-magnetic metallic object in the ore and this must of course be completely unsatisfactory.

With a device according to the present invention these disadvantages are avoided. The invention relates to a device for detecting material in which the material acts on an electrical or magnetic field in the resonance circuit of an oscillator, where the resonance circuit is constituted of a series connection of a search coil and a capacitor, in addition to which the degree of feed-back coupling of the oscillator is determined by the ratio between the voltage across a reactive element in the resonance circuit and its feeding voltage and dependent on the Q-factor of the resonance circuit. The invention is characterised by the fact that search coil is parallel connected to a reactor which has large inductance and large resistance compared with the search coil.

By means of the capacitor in the resonance circuit, the resonance frequency is chosen so that the smallest influence of the ore is obtained and by suitably choosing the reactor the sensitivity of the device to ore can be reduced to 3 or 4% of the sensitivity without the reactor. It is true that the sensitivity to non-magnetic metallic objects is also reduced, but not nearly to the same extent, and a relay connected to the output of the device can be adjusted so that it does not give a signal for the small changes in the output which are caused by changes in the ore flux, but only for such changes in the output which are caused by non-magnetic metallic objects.

On the accompanying drawing a connection diagram for the device is shown.

An electron tube 1 together with a cathode resistor 2 and a capacitor 3 operate as a cathode follower and feed a series resonance circuit which comprises a coil 4 and a capacitor 5. The grid 6 of the tube is connected to the series resonance circuit across a connection capacitor 7. The connection capacitor 7 separates the grid from a D.C. point of view from earth. An alternate voltage is taken out from the anode resistor 8 and is transmitted across a connection capacitor 9 to a rectifier of voltage doubler type, comprising two valves 10 and 11 and a capacitor 12 which is loaded with a resistor 13. The voltage across the capacitor 12 which is negative is superimposed on a positive voltage which is taken out from a potentiometer 14 which in series with a resistor 15 is connected to the battery 16. The difference voltage is carried to the grid 6 of the electron tube across a delay link which comprises a series resistor 17 and a parallel capacitor 18. A resistor 19 is connected between the capacitor 18 and the grid 6 in order that the capacitor shall not short circuit the resonance circuit. Parallel to the coil 4 of the resonance circuit a reactor 20 is connected. Its inductance and resistance are much greater than the inductance and resistance of the coil 4. The reactor 20 has iron cores of laminated plate with an air gap, while the coil 4 is the search coil of the device and is arranged so that the material which is to be examined will pass through or very close to the coil.

When the device is used for indicating the presence of metallic objects in for example magnetic ore, the search coil 4 is placed so that the ore passes through or very close to it, but, since the total inductance of the resonance circuit is great on account of the reactor 20, the increase in the output from the device which is caused by the increased inductance in the coil 4 will be very small. In practice this means that the device has become relatively insensitive to variations in the quantities of ore which pass the search coil. By means of the capacitors 3 and 5, the resonance frequency of the resonance circuit is chosen so that there is the smallest influence of the ore and by suitably choosing components the sensitivity of the device to the ore can be reduced to 3 or 4% of the sensitivity without the reactor. In practice the best result has been obtained if the frequency is chosen so that it is somewhat higher than that which gives maximum Q-value for the circuit.

If a metallic object which is within the ore enters the search coil, the resistance of the circuit will increase on account of eddy currents being induced in the metallic object. This resistance increase acts as a load on the circuit and effects a reduction in the amplitude of the output of the device.

It is true that the resistance of the reactor causes a reduction of the sensitivity of the device regarding metallic objects in the search coil, but this reduction is considerably less than the reduction in sensitivity to ore which the reactor brings about. The signal taken out from the output terminal 21 of the device across the capacitor 22 is fed to a relay which can be made insensitive to the small signal variations which the ore brings about, but which on the other hand is sensitive to the relatively large signal changes which the metallic objects in the ore cause.

I claim:

Device for detecting the presence of metallic objects in magnetic ore comprising an oscillator having a resonant circuit, the flux of which is influenced by the proximity of magnetic material, said resonant circuit comprising a detector coil and a capacitor, said oscillator having a feedback ratio determined by the ratio between the voltage across a reactive element of said resonant circuit and the feed voltage of said resonant circuit and dependent on the Q-factor of said resonant circuit, a reactor having a core of laminated steel provided with an air gap connected in parallel to said detector coil having an inductance and resistance substantially greater than those of said coil.

References Cited

UNITED STATES PATENTS

| 2,576,173 | 11/1951 | Cornelius | 331—65 |
| 2,919,413 | 12/1959 | Charles | 331—65 |

ROY LAKE, *Primary Examiner.*

JOHN KOMINSKI, *Examiner.*